United States Patent [19]

Van Rooy et al.

[11] Patent Number: 4,520,291
[45] Date of Patent: May 28, 1985

[54] PICK-UP UNIT COMPRISING A CAMERA TUBE

[75] Inventors: Henricus J. Van Rooy; Martinus J. Tops, both of Eindhoven, Netherlands

[73] Assignee: U.S. Philips Corporation, New York, N.Y.

[21] Appl. No.: 535,550

[22] Filed: Sep. 26, 1983

Related U.S. Application Data

[63] Continuation of Ser. No. 312,478, Oct. 19, 1981, abandoned.

[30] Foreign Application Priority Data

Nov. 12, 1980 [NL] Netherlands ...................... 8006166

[51] Int. Cl.³ ........................ H01J 31/00; H01J 31/26
[52] U.S. Cl. .................................... 313/365; 313/373; 313/384
[58] Field of Search ............... 313/365, 366, 367, 373, 313/376, 379, 382, 384, 390

[56] References Cited

U.S. PATENT DOCUMENTS

| | | | |
|---|---|---|---|
| 3,887,827 | 6/1975 | Katayama | 313/366 |
| 4,039,986 | 3/1977 | Nakazawa et al. | 335/212 |
| 4,310,778 | 1/1982 | Horseling | 313/384 |

Primary Examiner—William L. Sikes
Assistant Examiner—Robert E. Wise
Attorney, Agent, or Firm—Marc D. Schechter

[57] ABSTRACT

In a pick-up unit, a tube base for a camera tube is integrated with a coil former having a system of coils. As a result, the length of the pickup unit is small so that it is possible to manufacture portable cameras of small dimensions. The radial position of the tube with respect to the coil former is fixed by centering means provided in the tube base and in a sealing cap engaging the coil former. The axial position of the tube relative to the coil former is fixed by urging the tube against an abutting face of the sealing cap by means of a spring. The coil former is surrounded by a μ-metal screening sleeve consisting of two portions. The two portions of the screening sleeve are coupled together by means of a clamping ring.

10 Claims, 6 Drawing Figures

PICK-UP UNIT COMPRISING A CAMERA TUBE

This is a continuation of application Ser. No. 312,478, filed Oct. 19, 1981, now abandoned.

BACKGROUND OF THE INVENTION

The invention relates to a pickup unit for cameras comprising a camera tube having at one end a window portion and at the other end a bottom portion. The camera tube is surrounded by a coil former which is provided with coils, and the camera tube is centered relative to the coil former near the window portion and near the bottom portion.

Such a pickup unit is known from German Patent Application No. 26 07 728 (corresponding to U.S. Pat. No. 4,039,986). In this unit, the camera tube is centered with respect to the coil former near the window portion and near the bottom portion by means of O-rings. However, such O-rings are flexible and are hence deformed irregularly, so that accurately centering the camera tube relative to the coil former is not possible. In this known unit, the position of the coil dormer with respect to the camera tube, viewed in the axial direction, is indefinite. The camera tube can easily move in the coil former. Furthermore, the tube has a base with lead-through pins for the electric connections of the tube. As a result of this the overall length of the camera tube is comparatively large, which restricts the manufacture of compact portable cameras of small dimensions.

SUMMARY OF THE INVENTION

It is an object of the invention to provide a pickup unit comprising a camera tube which has a simple construction, which has comparatively small dimensions, and in which the position of the camera tube relative to the coil former is fixed accurately in all directions.

For these purposes, in a pickup unit according to the invention the camera tube, near the bottom portion, is provided with laterally led-through contact strips. At the end of the coil former facing the window portion of the tube, a sealing cap is connected to the tube. The sealing cap has an abutting surface which extends perpendicular to the axis of the coil former and has an aperture. The sealing cap further comprises means for centering the window portion of the camera tube relative to the coil former. A tube also base for the camera tube forms part of the coil former. The tube base comprises means for centering the bottom portion of the camera tube relative to the coil former and resilient means which urge the camera tube against the abutting surface of the sealing cap. The tube base further comprises contact means which contact the contact strips of the camera tube led through laterally.

Since the tube base forms part of the construction of the coil former, the length of the pickup unit can be considerably reduced. This makes the pickup unit particularly suitable for incorporation in small portable cameras.

The camera tube according to the invention does not comprise leadthrough pins but has laterally led-through contact strips which contact springs provided in the tube base. Such laterally led-out contact strips are described in the previously filed Netherlands patent application No. 8005230 and U.S. patent application Ser. No. 294,970, filed Aug. 21, 1981 (PHN 9840) which is hereby incorporated by reference. Centering means which center the bottom portion of the camera tube relative to the coil former are also present in the tube base. At the end of the coil former facing the window portion of the tube, a sealing cap is connected which has an abutting face. The camera tube is urged against the abutting face of the cap by resilient means provided in the tube base. Means for centering the window portion of the camera tube relative to the coil former are also present in the sealing cap. In this manner the position of the camera tube is fixed both in the radial direction and in the axial direction relative to the coil former.

The pickup unit according to the invention has the further advantage that the position of the window of the camera tube is maintained when the camera tube and/or the coil former expand or contract. When the camera tube and/or the coil former expand or contract, the resilient means present in the tube base is compressed to a greater or lesser extent, while the window portion of the tube remains urged against the abutting face of the sealing cap. As a result, the scene to be recorded always remains focused sharply on the target provided on the inside of the window.

In a first embodiment of the pickup unit according to the invention, the means for centering the bottom portion and the window portion of the camera tube are each formed by three abutment members. These abutment members project radially inward from the circumference of a circle and extend in an axial direction. One of the members is constructed so as to be resilient in the radial direction. The bottom portion and the window portion each have two fixed abutment members. The member which is resilient in the radial direction ensures that the tube firmly engages the two abutment members.

In a second embodiment of the pickup unit according to the invention, the sealing cap is detachably connected to the coil former, and the sealing cap is connected in a metal screening sleeve in which the coil former is fittingly provided. Usually a metal screening sleeve is provided around the coil former so as to screen the camera tube from interfering magnetic fields. The sealing cap is connected in the screening sleeve. By placing the screening sleeve around the coil former the sealing cap is urged against the coil former.

In a third embodiment of the pickup unit the screening sleeve consists of a first and a second cylindrical portion. The first portion abuts against a part of the coil former the outside diameter of which is equal to the outside diameter of the first portion of the screening sleeve. The second portion comprises the sealing cap. The inside diameter of the second portion is equal to the outside diameter of the first portion. The first and second portions are detachably coupled together.

In order to prevent the sealing cap from working loose from the coil former, the screening sleeve is constructed as two parts. The first part surrounds the coil former partly and abuts against a part of the coil former which has an outside diameter equal to the outside diameter of the first part. In this manner the coil former assumes a fixed position relative to the first part of the screening sleeve. The second part of the screening sleeve is connected to the sealing cap. The sealing cap is moved over the free part of the coil former until the sealing cap engages the coil former, after which the first part and the second part of the screening sleeve are coupled together. In this manner a rigid engagement of the sealing cap against the coil former is ensured. Since in addition the two parts are detachably coupled it is possible to replace the camera tube in the pickup unit in a simple manner in case the tube fails to perform properly.

An embodiment of a detachable coupling in which the two parts need not be rotated relative to each other is characterized in that the first and the second part of the screening sleeve are coupled together by means of a ring. The ring has at least two internal wedge-shaped parts extending along the direction of the circumference, and increasing in the axial direction. The wedge-shaped parts drive apart lugs, which are connected at the facing ends of the first and second parts, to such an extent that the sealing cap connected in the first part is urged against the coil former.

DESCRIPTION OF THE PREFERRED EMBODIMENTS

Figure 1:
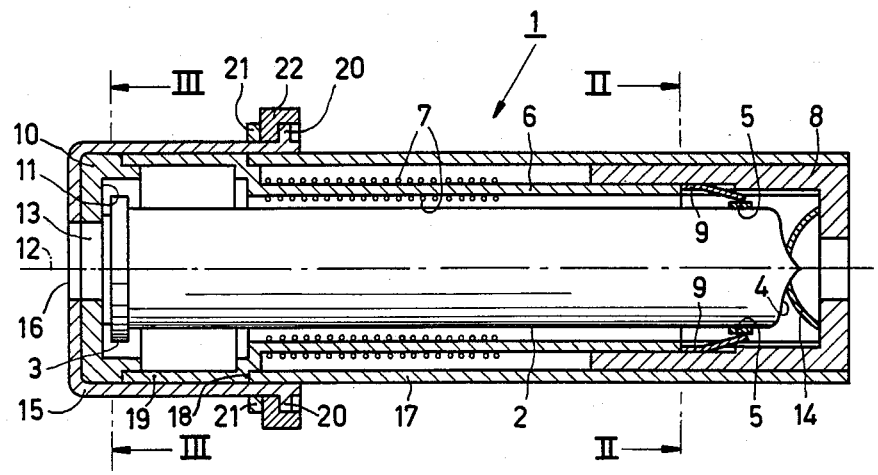
FIG. 1 is a sectional view of the pickup unit.

FIG. 1 is a longitudinal sectional view of the pickup unit 1. The camera tube 2, of which only the relevant components are shown, has a window portion 3 and a bottom portion 4. In the side wall of the tube 2 near the bottom portion 4 conductive strips 5 are led out. Strips 5 are connected within the tube to the various electrodes.

The tube 2 is surrounded by a coil former 6 which has a system of coils 7. A tube base 8, which closely fits around the end of the coil former 6 faces the bottom portion 4 of the tube and is attached to the coil former 6 of a glue. The tube base 8 and the coil former 6 may also be one integral part.

A number of contact springs 9 are provided in the wall of the tube base 8 and engage the conductive strips 5 of the tube 2. Also present in the tube base 8 are three abutments (not visible in FIG. 1) for centering the bottom portion of the tube 2 in base 8. These abutments will be further explained in detail with reference to FIG. 2.

Sealing cap 10 is detachably connected to the end of the coil former 6 facing the window portion 3. The face 11 of the sealing cap 10 which is perpendicular to the axis 12 of the coil former 6 has an aperture 13. The window 3 of the tube 2 engages the face 11. A firm engagement of the tube 2 against the face 11 is ensured by means of a spring 14 in the tube base 8 which urges the tube 2 agains the face 11.

The sealing cap 10 is also provided with three abutments (not visible in FIG. 1) for centering the window portion 3 of the tube relative to the coil former 6. These abutments will be explained in detail with reference to FIG. 3.

The sealing cap 10 is detachably connected to the coil former 6. The sealing cap 10 is located in a /μ-metal cap 15 which has an aperture 16 and which, together with a /μ-metal cylinder 17, forms a screening sleeve so as to screen the tube 2 from interfering magnetic fields. The cylinder 17 abuts against an edge 18 of the portion 19 of the coil former 6. The outside diameter of portion 19 is equal to the outside diameter of the cylinder 17. The inside diameter of the cap 15 is equal to the outside diameter of the portion 19 of the coil former 6.

At its end, the cap 15 has a number of lugs 20 and the cylinder 17 has a number of lugs 21, both spaced circumferentially around axis 12. When the cap 15 with the sealing cap 10 connected therein, is slid onto the coil former 6, the lugs 21 of the cylinder 17 slide into slots (not visible) provided in the cap 15. The lugs 20 and 21 are driven apart by means of a ring 22 which has on its inside two wedge-like portions. Hence, the cap 15 and the cylinder 17 are forced toward each other until the sealing cap 10 engages the coil former 6.

Figure 2:
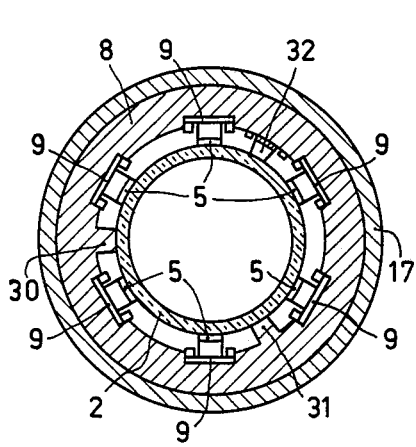
FIG. 2 is a cross-sectional view taken on the line II—II of FIG. 1.

FIG. 2 is a sectional view taken on line II—II of FIG. 1. The tube base 8 accurately fits within the screening cylinder 17. The inside of the tube base 8 is provided with a number of contact springs 9. Springs 9 make contact with the conductive strips 5 which extend along the envelope of the tube. Furthermore, two fixed abutments 30 and 31, and an abutment 32 which is resilient in a radial direction, are present on the inside of the tube base 8. The resilient abutment 32 ensures that the tube 2 will engage the abutments 30 and 31. The bottom portion of the tube 2 is accurately centered in this manner with respect to the tube base 8. Further means may be provided in the tube base 8 which lock the tube 2 against rotation with respect to the coil former 6.

Figure 3:
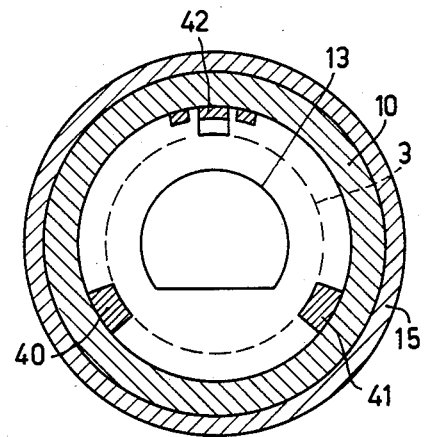
FIG. 3 is a cross-sectional view taken on the line III—III of FIG. 1.

FIG. 3 is a sectional view taken on line III—III of FIG. 1. The sealing cap 10 connected to the screening cap 15. The sealing cap 10 has at its inner circumference two fixed abutments 40 and 41, and an abutment 42 which is resilient in a radial direction. With these three abutments the window portion 3 of the tube 1 is accurately centered with respect to the coil former 6.

The radial position of the tube 2 with respect to the coil former 6 is fixed by the unambiguous centering of the bottom portion 4 and the window portion 3 relative to the coil former 6. The axial position, of the tube 2 relative to the coil former 6 is fixed by urging the window portion 3 of the tube 2 toward the face 11 of the sealing cap 10 by the spring 14 provided in the tube base 8. As a result, the window 3 engages face 11 of cap 10. This engagement is maintained, even upon expansion of the tube 2 and/or coil former 6. In the case of expansion, the spring 14 is compressed to a greater or lesser extent while the window 3 of the tube 2 remains urged against the face 11 of the sealing cap 10. As a result, the scene to be picked up is always sharply displayed on the target provided on the inside of the window.

Since the tube base 8 forms one integral part with the coil former 6, the length of the pickup unit is small, which makes the pickup unit particularly suitable for incorporation in small portable cameras. Since the tube base 8 forms part of the coil former 6, a saving in weight of the pickup unit is also achieved. Since, moreover the screening sleeve consists of two detachable parts, it is possible to replace the camera tube in a sinple manner if the coil or tube in the pickup unit fail to perform properly.

Figure 4A:
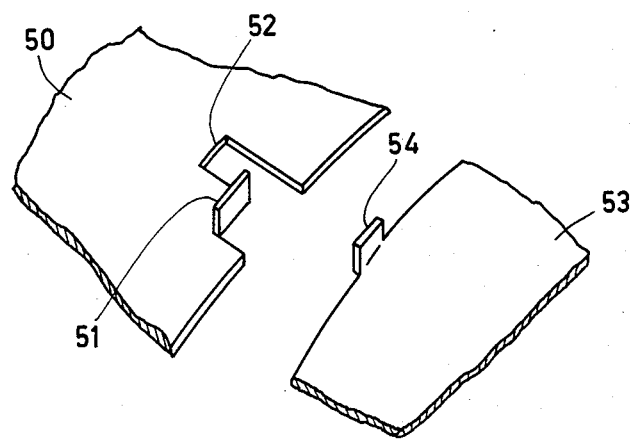
FIG. 4a schematically a part of the screening sleeve.

FIG. 4a shows a part of the screening sleeve to explain the coupling between the two parts thereof. The screening cap 50 has at least two outwardly bent-over lugs 51. A slot 52 is provided beside the lug 51. The screening cylinder 53 also has at least two outwardly bent-over lugs 54. Upon coupling the screening cap 50 to the screening cylinder 53 the lug 54 engages in the slot 52. By means of a ring shown in FIGS. 4b and 4c, the lugs 51 and 54 are driven apart until the sealing cap, which is connected in the screening cap, engages the coil former party surrounded by the screening clyinder 53. (See, also, FIG. 1.)

Figure 4B:
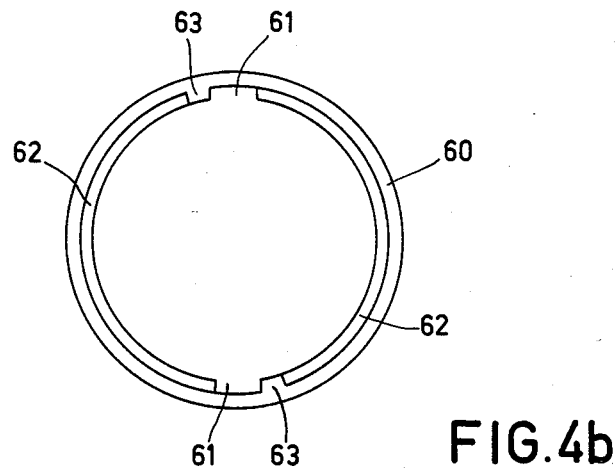
FIG. 4b is a plan view of the ring of the screening sleeve.
Figure 4C:
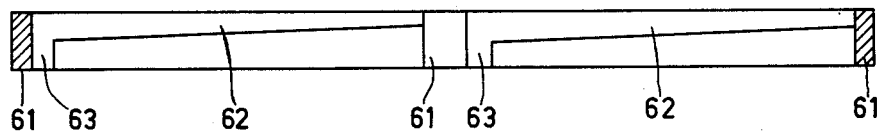
FIG. 4c shows a development of the ring shown in FIG. 4b.

FIG. 4b is an elevational view of the ring with which the screening cap 50 and the screening cylinder 53 are coupled. The ring 60 has two notches 61 to allow the ring 60 to be slid over the lugs 54 of the screening cylinder 53. The ring 60 furthermore has two wedge-like parts 62 and two abutments 63 which limit the angle over which the ring 60 can be rotated. FIG. 4c shows for clarity a development of the ring 60. The screening cap 50 and the screening cylinder 53 can be coupled together by means of the ring 60, without the need to rotate these parts relative to each other.

As an alternative to a sealing cap which is connected in the screening cap and which is detachably secured against the coil former, it is possible, after assembling the tube in the coil former, to connect the sealing cap to the coil former in a fixed or non-fixed manner. Then a metal screening sleeve which is formed as one assembly can be moved over the coil former.

What is claimed is:

1. A pickup unit comprising:
   a camera tube having two ends with a window portion at one end and a bottom portion at the other end, said camera tube having contact strips laterally led through the bottom portion of the tube; and
   a coil former having an axis and two ends, said coil former surrounding the camera tube, said camera tube being radially centered relative to the ends of the coil former near the window and bottom portions of the tube, said coil former being provided with coils;
   characterized in that:
   the pickup unit further comprises a sealing cap connected to the end of the coil former at the window portion of the tube, said sealing cap having an abuting face which extends perpendicular to the axis of the coil former and an aperture in the abuting face, said sealing cap comprising means for radially centering the window portion of the camera tube relative to the coil former; and
   the coil former further comprises a tube base at the bottom portion of the tube, said tube base comprising:
   means for radially centering the bottom portion of the camera tube relative to the coil former;
   resilient means for urging the camera tube axially against the abuting face of the sealing cap; and
   means for contacting the contact strips of the camera tube.

2. A pickup unit as claimed in claim 1, characterized in that the means for radially centering the bottom portion of the camera tube comprises three abutment members extending radially inward from the tube base and also extending in an axial direction, one of said abutment members being resilient in the radial direction.

3. A pickup unit as claimed in claim 2, characterized in that;
   the screening sleeve comprises first and second cylindrical portions having outer and inner diameters;
   the coil former has a portion with an outer diameter equal to the outer diameter of the first portion of the screening sleeve;
   the first portion of the screening sleeve abuts against the portion of the coil former with the same outer diameter;
   the second portion of the screening sleeve contains the sealing cap and has an inner diameter equal to the outer diameter of the first portion of the screening sleeve; and
   the first and second portions of the screen sleeve are detachably coupled together.

4. A pickup unit as claimed in claim 1, characterized in that the means for radially centering the window portion of the camera tube comprises three abutment members extending radially inward from the sealing cap and also extending in an axial direction, one of said abutment members being resilient in the radial direction.

5. A pickup unit as claimed in claim 1, 2, or 4, characterized in that:
   the pickup unit further comprises a metal screening sleeve which encloses both the sealing cap and the coil former; and
   the sealing cap is detachably connected to the coil former by the metal screening sleeve.

6. A pickup unit as claimed in claim 5, characterized in that:
   the screening sleeve comprises first and second cylindrical portions having outer and inner diameters;
   the coil former has a portion with an outer diameter equal to the outer diameter of the first portion of the screening sleeve;
   the first portion of the screening sleeve abuts against the portion of the coil former with the same outer diameter;
   the second portion of the screening sleeve contains the sealing cap and has an inner diameter equal to the outer diameter of the first portion of the screening sleeve; and
   the first and second portions of the screening sleeve are detachably coupled together.

7. A pickup unit as claimed in claim 6, characterized in that:
   the first and second portions of the screening sleeve have facing ends which have lugs connected thereto; and
   the first and second portions of the screening sleeve are detachably coupled together by means of a ring having at least two wedge-shaped portions, the wedge-shaped portions having widths which increase axially as a function of circumferential position along the ring, said wedge-shaped portions being provided between lugs so as to drive lugs connected to the first portion of the screening sleeve apart from lugs connected to the second portion of the screening sleeve, until the sealing cap is urged against the coil former.

8. A pickup unit as claimed in claim 4, characterized in that:
   the screening sleeve comprises first and second cylindrical portions having outer and inner diameters;
   the coil former has a portion with an outer diameter equal to the outer diameter of the first portion of the screening sleeve;
   the first portion of the screening sleeve abuts against the portion of the coil former with the same outer diameter;
   the second portion of the screening sleeve contains the sealing cap and has an inner diameter equal to the outer diameter of the first portion of the screening sleeve; and
   the first and second portions of the screening sleeve are detachably coupled together.

9. A pickup unit as claimed in claim 8, characterized in that:
the first and second portions of the screening sleeve have facing ends which have lugs connected thereto; and
the first and second portions of the screening sleeve are detachably coupled together by means of a ring having at least two wedge-shaped portions, the wedge-shaped portions having widths which increase axially as a function of the circumferential position along the ring, said wedge-shaped portions being provided between lugs so as to drive lugs connected to the first portion of the screening sleeve apart from lugs connected to the second portion of the screening sleeve, until the sealing cap is urged against the coil former.

10. A pickup unit as claimed in claim 3, characterized in that;
the first and second portions of the screening sleeve have facing ends which have lugs connected thereto; and
the first and second portions of the screening sleeve are detachably coupled together by means of a ring having at least two wedge-shaped portions, the wedge-shaped portions having widths which increase axially as a function of the circumferential position along the ring, said wedge-shaped portions being provided between lugs so as to drive lugs connected to the first portion of the screening sleeve apart from lugs connected to the second portion of the screening sleeve, until the sealing cap is urged against the coil former.

* * * * *